May 29, 1956 — W. R. WORKS ET AL — 2,748,046
METHOD OF EDGE-SURFACING WOODY PRODUCTS
Filed April 12, 1954
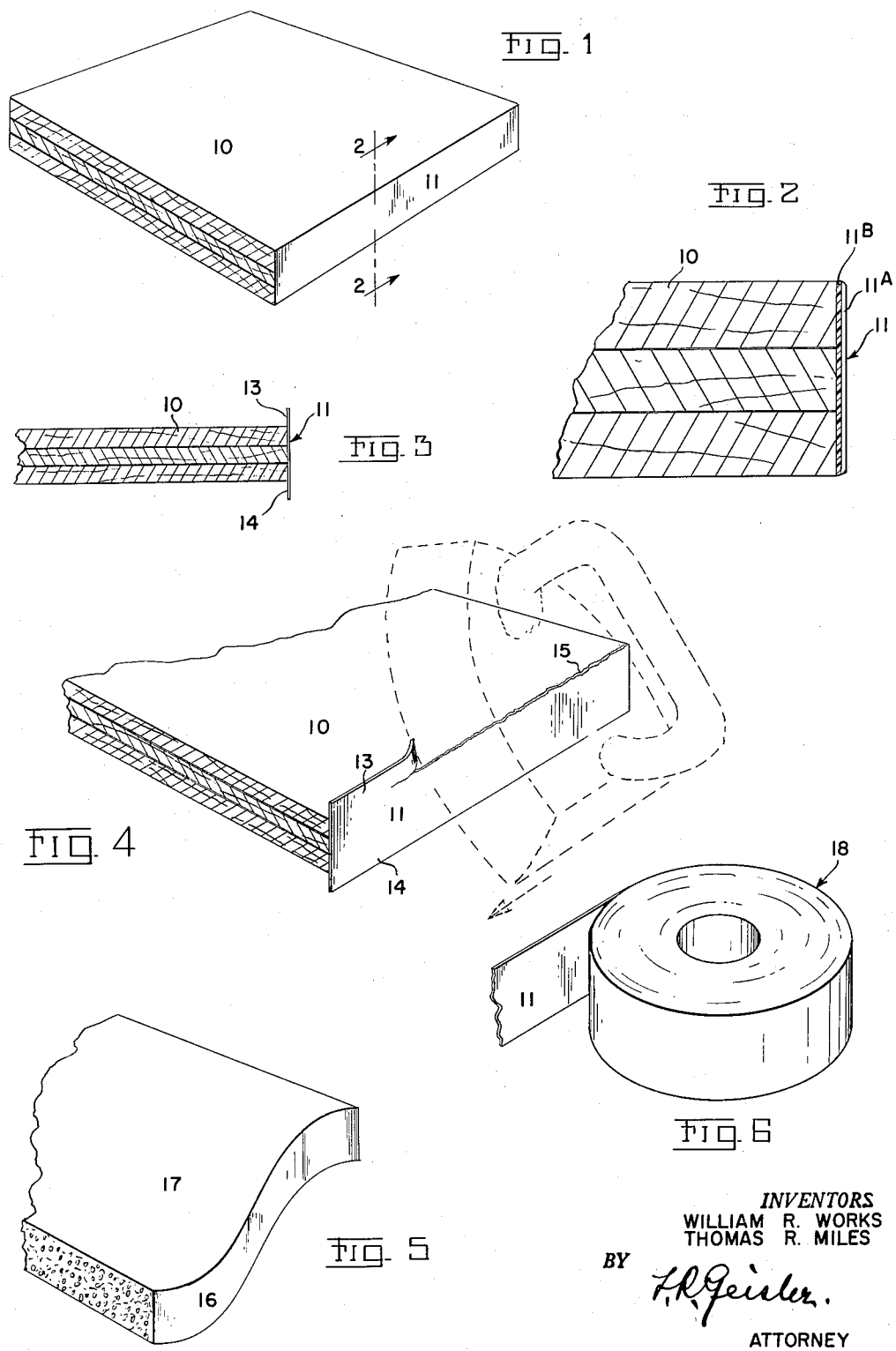
INVENTORS
WILLIAM R. WORKS
THOMAS R. MILES
BY
ATTORNEY

2,748,046

METHOD OF EDGE-SURFACING WOODY PRODUCTS

William R. Works, Camas, Wash., and Thomas R. Miles, Beaverton, Oreg., assignors to Crown Zellerbach Corporation, San Francisco, Calif., a corporation of Nevada Application April 12, 1954, Serial No. 422,294

6 Claims. (Cl. 154—116)

This invention relates in general to boards and the like, formed of woody material, in which at least one edge of the woody material article is covered with an edge-surfacing strip.

More specifically, this invention relates to boards or similar articles, formed of wood or woody composition material, and, in particular, to plywood panels, having an edge surface finished with a novel, fibrous, cellulosic strip.

The sawed edges of boards, and especially the edges of plywood panels, have heretofore been covered in various ways due to the fact that such edge surfaces present an unfinished appearance, are rough, irregular, porous, or contain small gaps or other imperfections. In addition to presenting an unfinished appearance, such edge surfaces generally cannot even be satisfactorily painted, and penetration of moisture from the air into such surfaces may cause deterioration or decay within the board or panel. A rough, or very porous, unfinished edge surface will also accumulate dirt and dust.

The edge-surfacing of boards and plywood panels with strips of wood veneer is very old and well known. This is an expensive procedure and consequently is employed only in such instances where the value of the completed product justifies the cost of such edge finishing.

Edge-surfacing is also sometimes done with metal strips, as well as with plastic moldings and the like, these strips and moldings being secured to the board edge by screws, nails or other mechanical fastenings, or by the use of wet glues employed in wood-working. Such strips or moldings are not satisfactory for all purposes, they are relatively expensive, and require more or less labor for proper mounting in place.

An object of the present invention is to provide a board or panel or similar woody article in which at least one edge surface will be covered by a novel edge-surfacing strip differing from, and in many respects superior to, the strips heretofore employed for this purpose.

A further object of the invention is to provide an edge-surfaced woody product in which the surfaced edge will have a high resistance to abrasion, moisture, deterioration and decay.

A further specific object of the invention is to provide a board having an edge-surfacing strip of a special fibrous cellulosic material firmly and permanently bonded to the edge surface by a heat-activatable adhesive.

An additional object of the invention is to provide a woody product having an edge-surfacing strip which is relatively inexpensive in itself, will cause such woody product to have a smooth and uniform edge surface, free from any defects and particularly adaptable for painting.

Another important object of the invention is to provide a new method of edge-surfacing a woody product which will enable the edge-surfacing operation to be performed quickly, easily and inexpensively, in contrast to the methods of edge-surfacing hitherto employed, and thus without greatly increasing the overall cost of the finished woody product.

We attain these objects and other advantages by fabricating a novel edge-surfacing strip fabricated as hereinafter described, and by finishing the edge surface of the woody material with such a strip in the manner hereinafter briefly explained.

In the following description and explanation reference is made to the accompanying drawings wherein:

Figure 1 is a fragmentary perspective view of a portion of a plywood panel having one edge finished in accordance with our invention;

Figure 2 is a fragmentary sectional elevation taken on line 2—2 of Figure 1 and drawn to an enlarged scale;

Figure 3 is an elevation showing the edge-surfacing strip on the panel at the conclusion of the first step in our edge-surfacing operation;

Figure 4 is a fragmentary perspective view illustrating one way in which the second step of the edge surfacing operation may be performed;

Figure 5 is a fragmentary perspective view showing a composition board having one edge finished in accordance with our invention; and Figure 6 is a perspective view showing a roll of our special edge-surfacing strip ready for use in the finishing of an edge surface of a plywood panel or any other woody board or similar product.

Briefly, for fabricating the novel edge-surfacing strip which we employ in the carrying out of our invention, we use a flexible fibrous cellulosic material, such as paper, as a backing sheet and coat one side of the same with an adhesive having certain very definite characteristics, the adhesive enabling the resulting edge-surfacing strip to be permanently bonded to the edge surface of the woody product under certain temperature and pressure conditions.

Various types of pulp from fibrous raw materials may be used for manufacturing the sheet material or paper from which backing for our edge-surfacing strip is made. The pulp may be produced by the conventional acid, alkaline, or semi-chemical pulping processes and made into paper sheet material on the conventional paper-making machine. A certain amount of groundwood may be added to any of these pulps. We have found that a pulp furnish comprising about 90% unbleached softwood sulfite pulp and about 10% groundwood pulp is particularly suitable for the manufacture of the paper to be converted into our edge-surfacing strip.

Although it is not absolutely essential, nevertheless we consider the use of a paper, throughout which a thermosetting resin has been distributed, to be preferable. For this purpose such resin may be conveniently incorporated into the paper sheet by any of the impregnation processes known in the art, or the resin may be added to the pulp slurry, uniformly distributed therein, and precipitated on the fibers by an acidic agent. One thermosetting resin, suitable for the addition to pulp, is an alkaline, water-soluble phenol-aldehyde resin, "Amres 1410," manufactured by the American Marietta Company, Chicago, Illinois. The characteristic properties of this resin are: specific gravity 1.165±0.01, viscosity 550–880 centipoises, solids content 50.0%±1.5%, pH 9.2–9.6, and water dilutability at 25° C. about 3.3 parts water to 1 part resin. Other types of phenolic resins, urea-aldehyde or melamine-aldehyde resins may be also used for this purpose. A resin-containing sheet of paper may be also made by adding a resin to the pulp, forming the sheet, and impregnating the formed sheet with the same or another resin.

The quantity of the resin to be incorporated into the sheet for the manufacture of our edge-surfacing strip may vary depending on the final desired requirements for the edge-surfacing strip. For a satisfactory sheet for our purpose, an amount of from about 10% to about 100% of resin solids based on the weight of dry fiber may be added. The preferred quantity, however, for a highly satisfactory backing is from about 30% to about 35% of resin solids based on the weight of dry fiber.

After the sheet of paper is made, it is coated on one side with an adhesive composition comprising as its major ingredient a thermosetting, alkaline phenol-aldehyde resin and a minor proportion of a thermoplastic resin, such as polyvinyl acetate, plasticized polystyrene or polyamide. By combining these two types of resins in proportions hereinafter described, a heat-activatable adhesive is produced which we have found to be highly satisfactory for the adhesive coating which is an essential element of our edge-surfacing strip.

For the thermosetting phenol-aldehyde resin to serve as the major ingredient of this adhesive, we have found that an alkali-catalyzed, B-stage, water-soluble, alkaline phenol-formaldehyde resin is very suitable. Some commercially available resins having the above mentioned properties are: "Amres 1400," made by the American Marietta Company, the characteristic properties of which are specific gravity 1.20±0.01, viscosity 550–880 centipoises, solids content 63.0%±1.5%, pH 9.3±0.1, and its water dilutability at 25° C. about 3.5 parts water to 1 part resin; another satisfactory resin having similar properties to "Amres 1400" described above is "G 37–106," made by the Monsanto Chemical Company.

A suitable thermoplastic resin which may be used in combination with the thermosetting resin for producing the desired adhesive composition is a water emulsion of polyvinyl acetate, produced by E. I. du Pont de Nemours and Company, Incorporated, under designation "Elvacet 81–900." The characteristic properties of this emulsion are: specific gravity at 25° C. 1.11, viscosity 800–1000 centipoises, pH at 25° C. 4–6, and monomeric vinyl acetate content less than 1%. Other polyvinyl acetate resins in form of aqueous emulsions which are satisfactory for this purpose are "Polyco 117 H" and "Polyco 345," both made by the American Polymer Corporation, and "Gelva S–55," made by the Shawinigan Chemical Company. Furthermore, other suitable thermoplastic resins available commercially in form of emulsions, dispersions, or solutions are: a polystyrene resin "BKS–92" manufactured by Bakelite Corporation, the characteristics of which are specific gravity at 25° C. 1.03, viscosity 1500 centipoises, pH 9.0, or "Lustrex 620" produced by Monsanto Chemical Company, the characteristics of which are specific gravity at 25° C. 1.04, viscosity 5–15 centipoises, pH 8.0–9.0. A satisfactory plasticized polyamide resin is "B–200," the characteristics of which are specific gravity at 25° C. 1.02, viscosity 50–130 centipoises, pH 4.9–5.2, and a non-plasticized polyamide resin "A–000," the characteristics of which are specific gravity at 25° C. 1.01, viscosity 40–90 centipoises, pH 4.9–5.2, the latter two manufactured by General Mills Incorporated.

An inert filler may be added as an auxiliary constituent in the adhesive composition. We have found that walnut shell flour, sold by Agrashell, Incorporated, under the trade-name "Glufil WF-7," is particularly suitable for this purpose. However, other inert fillers, such as wood flour, bark flour, and the like may be utilized. The addition of a certain amount of inert filler renders the adhesive composition cheaper, gives a rougher surface to the final coating, thus decreasing a possible blocking of the coated strip especially when exposed to high relative humidity conditions, and increases somewhat the gap filling power of the adhesive during the surfacing of edges having defects or voids on their surface.

A very small amount of a base, such as ammonium hydroxide, may be also added to the adhesive composition to adjust its pH value to from about 7.0 to about 9.0, thus increasing its stability and storage life, and also improving somewhat the dispersion of the above mentioned constituents.

Water may be added to the mixture mainly for adjustment of its viscosity to a desired degree, suitable for the coating operation.

The relative quantities of these ingredients may be varied within certain limits, as indicated in the following table which shows their operative and preferred range, wherein the proportions are given as parts by weight.

| Ingredient | Operative Range | Preferred Range |
| --- | --- | --- |
| Phenol-aldehyde resin (solids basis) | 60–98 | 65–70 |
| Polyvinyl acetate resin (solids basis) | 40–2 | 35–30 |
| Inert filler (dry powder) | 0–20 | 10–15 |
| Ammonium hydroxide | Sufficient to adjust pH to about 7.0–9.0. | |
| Water | Sufficient to attain desired viscosity. | |

As previously mentioned, the essential ingredients for the adhesive composition are the phenol-aldehyde resin, the polyvinyl acetate resin, and an amount of water to attain desired viscosity of the mixture; the addition of the inert filler or of ammonium hydroxide is optional.

In preparing the adhesive composition, we prefer to add slowly the polyvinyl acetate resin to the phenol-aldehyde resin at room temperature while agitating until a homogeneous mixture is produced, followed by the addition of water. When either the inert filler or ammonium hydroxide, or both are to be incorporated, a predetermined amount of ammonium hydroxide is added to the water first, then the inert filler is mixed in until the aqueous slurry is free of lumps; the slurry is then added to the phenol-aldehyde resin, with stirring, and finally the polyvinyl acetate resin is mixed in. The whole mixture is agitated until it is substantially homogeneous.

The adhesive composition is then applied on one side of the paper or cellulosic backing sheet for our edge-surfacing strip by means of any conventional coating apparatus and the adhesive is then dried by any suitable means, thus resulting in a continuous film coating, which is normally non-tacky at substantially room temperature.

In order to insure satisfactory bonding property in our edge-surfacing strip, we prefer to apply the adhesive in such a manner that the weight of the dry coating will be from about 30 pounds to about 150 pounds per 3,000 square feet of the backing sheet, in other words, 150 pounds per ream (500 sheets 24x36 inches) of the backing sheet, the basis weight of the backing sheet alone being from about 60 pounds to about 300 pounds per ream. A highly satisfactory edge-surfacing strip may be produced using a backing sheet having a basis weight of 185 pounds to 200 pounds per ream and having a dry coating, the weight of which is from 60 pounds to 70 pounds per ream of the backing sheet.

Although it is preferable to apply the total desired amount of adhesive to the backing sheet in a one-step coating operation, some coating machines may not be capable of applying such a heavy coat of adhesive in one step. However, satisfactory results can also be achieved by coating the backing sheet in two steps. With such procedure the total amount of the adhesive may be evenly or unevenly divided between the two coating operations. However, the dry weight of the first coating should not be less than 10 pounds per ream of the sheet. After the first coating has been applied, it should be substantially dried prior to the application of the second coating, or otherwise a possible undesirable scuffing of the first coating may occur. The second coating is then dried by any suitable means.

The backing sheet, with the coating completed, either by one-step or two-step process, is then slit to any desired width suitable for surfacing an edge of the woody products for which it is intended, and wound in roll form for ease in handling, shipping and application.

The securing of the edge-surfacing strip to the edge of a woody board or panel may be carried out by means of an ordinary household flat-iron or by any other devices capable of supplying proper heat and pressure, such as a heat-sealing press, and the like. A piece of the edge-surfacing strip, preferably slightly longer and slightly wider than the edge to be covered, is cut from the roll. The coated side of the strip is applied to the edge face of the board or panel in such a manner that the entire surface of the edge is covered and free margins of the strip overlap said surface. The strip is then united to the edge face by pressure and heat for a period of time sufficient to achieve a permanent bond.

The uniting of the edge-surfacing strip to the edge surface of the woody product may be accomplished under various conditions regarding temperature, pressure and period of time for the heat-pressing operation. Thus, the pressure applied may be from about 5 pounds per square inch to about 200 pounds per square inch (this latter pressure being the pressure generally employed in the plywood industry), or even higher, the maximum pressure being such that no crushing of the woody board would occur. While it has been found that the quality of the bond improves with increased pressure up to about 50 pounds per square inch, it has also been found that higher pressure than 50 pounds per square inch does not produce any further improvement in the quality of the bond.

The temperature employed may be from about 270° F. to about 550° F., our preferred temperature being about 425° F.

The period of time during which the heat-pressing is continued may vary from about 20 seconds to about 7 minutes. It will be obvious that the higher the temperature the shorter the period required and vice versa, and the temperature and time period must, of course, be correlated to such extent that no charring or scorching of the paper or backing sheet of the edge-surfacing strip will occur.

The attainment of a satisfactory bond between the edge-surfacing strip and the edge surface may be visually observed when the adhesive, which is seen on the free margins of the edge-surfacing strip overlapping the edge surface but closely adjacent thereto, has changed from its original color under the action of the heat. Thus, when the adhesive comprises polyvinyl acetate or polystyrene, its original brownish-red color changes to purple; and, when the adhesive comprises a polyamide, the original color of the adhesive becomes almost black in the area very closely adjacent the edge surface of the woody product, gradually changing to dark purple toward the outer area of the surfacing strip.

After the edge-surfacing strip has been united to the edge surface, the free overlapping margins of the strip are removed in any convenient manner since, if the strip is made in the preferred manner previously described, the strip will have become brittle as a result of the heat treatment. For example, this may be done by passing the iron, inclined at about 45° to the edge surface, along the borders of the surfaced edge thus breaking off the excess of the strip, or by pressing the surfaced edge against a flat surface, such as a table top, and rocking the woody board or panel first to one side and then to the other side until the excess of the edge-surfacing strip is broken off, or by pressing a flat block against the borders of the surfaced edge, etc. The removal or breaking-off of the excess in this manner will leave the resulting border edges of the surfacing strip slightly rough, and the final step is to smooth such edges and relieve them slightly by sanding with a sanding block or any suitable sanding device.

Figures 1 and 2 of the accompanying drawings show a plywood panel 10 having one edge face finished or surfaced with the edge-surfacing strip 11, the backing sheet of the strip being indicated at 11–A in Figure 2 and the bonding adhesive coating at 11–B.

In Figure 3 the edge-surfacing strip 11 is shown immediately after being secured to the edge face of the plywood panel 10 by heat and pressure as previously described. The edge-surfacing strip 11 originally is preferably slightly wider than the thickness of the panel 10 so that marginal portions 13 and 14 of the surfacing strip extend out beyond the plywood panel surfaces. These extending marginal portions are then broken off, as previously described, one method of breaking off such portions being illustrated in Figure 4. The breaking-off of these marginal portions results in rough edges, such as indicated at 15 in Figure 4, extending slightly beyond the panel. These marginal edges are then relieved and smoothed by sanding, such finished edges being shown in Figures 1 and 2.

Our edge-surfacing strip may be used on edge faces which are curved as well as straight. In Figure 5 a curved edge face 16 of a composition board 17 is shown finished with the edge-surfacing strip.

Since the coating of adhesive of the edge-surfacing strip is dry and normally non-tacky at substantially room temperature, our edge-surfacing material can conveniently be made and stored in rolls of any desired size, ready for use, as illustrated by the roll 18 in Figure 6.

The following are specific examples of ways in which our invention has been successfully carried out:

*Example 1*

A sheet of paper, having a basis weight of 190 pounds per ream, made of a pulp furnish composed of 90% coniferous unbleached sulfite and 10% book-grade groundwood, and containing about 33 parts by weight of the thermosetting phenol-aldehyde resin "Amres 1410," manufactured by American Marietta Company, which resin was added to the pulp, uniformly distributed therein, and subsequently precipitated on the fibers with papermaker's alum, was coated on one side with an adhesive having the following composition:

| | Parts by weight |
|---|---|
| Phenol-aldehyde resin (solids basis) | 67 |
| Polyvinyl acetate resin (solids basis) | 33 |
| Water | 30 |

The phenol-aldehyde resin was "Amres 1400," a product of American Marietta Company, in the form of an aqueous solution with a solids content of about 64%. The polyvinyl acetate resin was "Elvacet 81–900," supplied by E. I. Du Pont de Nemours and Company as an aqueous emulsion containing about 55% solids.

The polyvinyl acetate resin was added slowly, with stirring, to the phenol-aldehyde resin at room temperature, and the two ingredients were stirred for a few minutes until a substantially homogeneous mixture was obtained; thereafter the 30 parts of water were added with stirring.

The adhesive coating was dried in a hot-air oven until a substantially dry film coating was obtained. The adhesive was applied to the paper in such a manner, that the amount of the final dry coating was about 60 pounds per ream of paper.

The coated paper was then slit to a 1¼ inch wide strip and made in roll form. A length of this strip, slightly longer than the length of the edge of a plywood panel, which was to be edge-surfaced, was cut from the roll. The edge face of the panel, the width of which was ¾ inch, was then covered with the edge-surfacing strip so that the coated side of the strip was in contact with the edge face of the plywood and approximately ¼ inch of the strip extended out of each side of the edge.

A household flat iron with the thermostat set at about 425° F. was then placed on the edge-surfacing strip and advanced slowly over the length of the edge from one end to the other at the approximate rate of six feet per minute, applying as much pressure with both hands as could be comfortably exerted. At the end of the passage of the iron over the edge-surfacing strip in this manner, a permanent bond between the strip and the edge face of the plywood panel was achieved. The excess extending portions of the strip were then broken off by passing the iron along each border of the edge at an approximate angle of 45° to the plane of the edge face of the panel. The borders of the resulting surface edge were then cleaned up and smoothened with a sanding block.

The resulting edge face of the finished plywood panel had a smooth, uniform, water-resistant, and abrasion-resistant surface, and this surface was very satisfactory for painting.

*Example 2*

|  | Parts by weight |
| --- | --- |
| Phenol-aldehyde resin (solids basis) | 67 |
| Polyvinyl acetate resin (solids basis) | 33 |
| 28% ammonium hydroxide | 0.2 |
| Water | 30 |

The phenol-aldehyde resin and the polyvinyl acetate resin used in this example were the same as those described in Example 1. The ammonium hydroxide used was a commercial 28% aqueous solution of ammonia.

The ammonium hydroxide was added to water. This solution was mixed into the phenol-aldehyde resin, and the polyvinyl acetate resin was then added slowly, with stirring, and agitated for a few minutes until a substantially homogeneous mixture was obtained. This adhesive composition was applied as a coating to the same paper described in Example 1, so that the final dry coating was of the amount of approximately 60 pounds per ream of paper.

The resulting edge-surfacing material was secured to an edge face of a woody particle board by a means of press provided with an upper smooth caul platen, whose surface was electrically heated to about 375° F., and a lower supporting, fixed bar. The whole length of the piece of edge-surfacing strip was pressed simultaneously against the board's edge face at about 175 pounds per square inch for about 30 seconds, after which time a highly satisfactory bond between the edge-surfacing strip and the edge face of the board was obtained. The borders of the surfaced-edge were finished as mentioned in Example 1. The resulting edge-surfaced face had a greatly improved impact resistance as compared to the original edge face prior to edge-surfacing.

*Example 3*

|  | Parts by weight |
| --- | --- |
| Phenol-aldehyde resin (solids basis) | 67 |
| Polyvinyl acetate resin (solids basis) | 33 |
| Walnut shell flour (dry powder) | 15 |
| 28% ammonium hydroxide | 0.2 |
| Water | 30 |

The phenol-aldehyde resin and the polyvinyl acetate resin were the same as mentioned in Example 1; the ammonium hydroxide was the same as mentioned in Example 2; the walnut shell flour was "Glufil WF-7," supplied by Agrashell, Incorporated.

A walnut shell flour aqueous slurry was first prepared by adding the flour to the 30 parts of water containing 0.2 part of ammonia, and stirring until free of lumps. The slurry was then added slowly to the phenol-aldehyde resin with stirring, and the polyvinyl acetate resin was added last and the whole mixture was stirred for a few minutes until it became substantially homogeneous.

A coating of this adhesive was applied to the resin-containing paper of Example 1 in the same amount as mentioned in Example 1. The edge-banding was then bonded to the edge of a woody particle board in the manner outlined in Example 2, and the surfaced edge was finished off as described in Example 1. This resulted in a highly satisfactory edge-surfaced board.

*Example 4*

The resin-containing paper of Example 1 was coated with the adhesive composition described in Example 3, so that the final dry coating was in the amount of about 60 pounds per ream of paper.

The edge-surfacing strip was then bonded to an edge face of a plywood panel by means of the press described in Example 2. The pressing conditions in the present example were as follows: Temperature of the upper platen; about 327° F.; pressure 50 pounds per square inch, and pressing time, 90 seconds.

The resulting bond between the edge face of the plywood panel and the edge-surfacing strip was highly weather-resistant. When subjected to the National Bureau of Standards weathering test, entitled "Accelerated Aging of Fiber Building Boards" and described in "Building Materials and Structures," Report BMS 4, National Bureau of Standards, U. S. Department of Commerce (1938), the edge-surfaced panel passed successfully 6 cycles of this test. There was no cracking, checking or delamination.

The edge-surfaced panel was highly satisfactory for exterior exposures.

*Example 5*

The resin-containing paper of Example 1 was coated in two separate coating steps by two adhesive compositions. The adhesive composition (A) for the first coating application contained the following ingredients:

| (A) | Parts by weight |
| --- | --- |
| Phenol-aldehyde resin (solids basis) | 85 |
| Polyvinyl acetate resin (solids basis) | 15 |
| Walnut shell flour (dry powder) | 15 |
| 28% ammonium hydroxide | 0.2 |
| Water | 30 |

The above ingredients were the same as in Example 3, and were mixed in the manner described in said Example 3.

The adhesive composition (B) for the second coating application was prepared using the following proportions:

| (B) | Parts by weight |
| --- | --- |
| Phenol-aldehyde resin (solids basis) | 60 |
| Polyvinyl acetate resin (solids basis) | 40 |
| Walnut shell flour (dry powder) | 15 |
| 28% ammonium hydroxide | 0.2 |
| Water | 30 |

The above ingredients were the same as in Example 3, and were mixed in the manner described in said Example 3.

First, the resin containing paper, as described in Example 1, was coated on one side with the adhesive (A), applying about 30 pounds of adhesive (dry basis) per ream of paper. The coating film was then substantially dried and a second coating composed of adhesive (B) was applied over the first coating film in such a manner that the weight of the second film was about 40 pounds (dry basis) per ream of paper. After the second coating film had been dried, the combined weight of the dry coating film applied by the two-step method was about 70 pounds per ream of paper. The edge-banding produced by such double-coated paper was bonded to an edge of a hardboard panel in the manner outlined in Example 2. The result was very satisfactory.

The resulting surface of the edges of woody products when edge-surfaced in accordance with our invention is hard, smooth, uniform, water-resistant, abrasion-resistant, highly suitable for painting and attractive in appearance, and this desirable edge-surfacing strip can be produced easily and quickly and at relatively low cost.

Edge-surfaced woody products, such as plywood, particle board, fiberboard, hardboard, lumber panels, and the like, produced in accordance with this invention, are highly suitable for various interior uses such as cabinets, cupboards, chests, doors of wardrobes, tops of tables and desks, shelves, partitions, built-ins, wall-panelling, etc., and for exterior uses such as sign panels, sidings, cement form panels, etc., in fact wherever a superior, durable edge surface for such products is desired. Furthermore, with our invention, edge-surfaced products may readily be produced in which the surfaced edges may include simple or compound curved surfaces as well as plane surfaces.

Having now described our invention in preferred embodiments, we claim:

1. In the finishing of a woody product, the process of forming a surfaced edge of said woody product, which process comprises employing a specially-prepared edge-surfacing strip consisting of a flexible fibrous cellulosic backing sheet coated on one face, with a continuous, substantially dry, film of heat-activatable adhesive, said adhesive having a thermosetting, alkaline water-soluble phenol-aldehyde resin as its major ingredient and a minor proportion of a thermo-plastic resin selected from the group consisting of polyvinyl acetate, plasticized polystyrenes and polyamides, the amount of adhesive being sufficient to produce a film weighing from about 30 pounds to 150 pounds per 3,000 square feet of sheet surface, covering at least one entire edge face of said woody product with said strip, the coated side of said strip being applied against said edge face, and securing said strip to said edge face by means of pressure and heat sufficient to produce a permanent bond between the strip and said edge face of said woody product and a smooth and uniform surfacing.

2. In the finishing of a woody product, the process of forming a surfaced edge of said woody product, which process comprises employing a specially-prepared edge-surfacing strip consisting of a flexible fibrous cellulosic backing sheet, containing therein a thermosetting resin with the particles of said resin distributed substantially uniformly throughout the sheet, and coated on one face, with a continuous, substantially dry, film of heat-activatable adhesive, said adhesive having a thermosetting, alkaline water-soluble phenol-aldehyde resin as its major ingredient and a minor proportion of a thermoplastic resin selected from the group consisting of polyvinyl acetate, plasticized polystyrenes and polyamides, the amount of adhesive being sufficient to produce a film weighing from about 30 pounds to 150 pounds per 3,000 square feet of sheet surface, covering at least one entire edge face of said woody product with said strip, the coated side of said strip being applied against said edge face, and securing said strip to said edge face by means of pressure and heat sufficient to produce a permanent bond between said strip and said edge face of said woody product and a smooth and uniform surfacing.

3. In the finishing of a woody board, the process of forming a surfaced edge of said woody board, which process comprises employing a specially-prepared edge-surfacing strip consisting of a flexible backing sheet of paper, containing therein a thermosetting phenol-aldehyde resin with the particles of said resin distributed substantially uniformly throughout the sheet, and coated on one face with a continuous, substantially dry, film of heat-activatable adhesive, said adhesive having a thermosetting, alkaline water-soluble, phenol-aldehyde resin as its major ingredient and a minor proportion of a thermoplastic polyvinyl acetate resin, the amount of adhesive being sufficient to produce a film weighing from about 30 pounds to 150 pounds per 3,000 square feet of sheet surface, covering at least one entire edge face of said woody board with said strip, the coated side of said strip being applied against said edge face, and securing said strip to said edge face by means of pressure and heat sufficient to produce a permanent bond between said strip and said edge face of said woody board and a smooth and uniform surfacing.

4. In the finishing of a woody board, the process of forming a surfaced edge of said woody board, which process comprises employing a specially-prepared edge-surfacing strip having a width greater than the thickness of said board and consisting of a flexible backing sheet of paper, containing therein a thermosetting phenol-aldehyde resin with the particles of said resin distributed substantially uniformly throughout the sheet, and coated on one face with a continuous, substantially dry, film of heat-activatable adhesive, said adhesive having a thermosetting, alkaline water-soluble phenol-formaldehyde resin as its major ingredient and minor proportions of a thermoplastic resin selected from the group consisting of polyvinyl acetate, plasticized polystyrenes and polyamides and of an inert filler, the amount of adhesive being sufficient to produce a film weighing from about 30 pounds to 150 pounds per 3,000 square feet of sheet surface, applying said strip to at least one edge face of said board with the coated side of said strip against said edge face, securing said strip to said edge face by means of pressure and heat sufficient to show a discoloration on the coated side of said strip along the excess portion of said strip and to produce a permanent bond between said strip and said edge face of said board and a smooth and uniform surfacing, breaking off said excess portion of said strip, and finally smoothing and relieving the resulting edges of said strip.

5. In the finishing of a plywood panel, the process of forming a finished edge of said panel which process comprises employing a specially-prepared edge-surfacing strip having a width greater than the thickness of said panel and consisting of a flexible fibrous cellulosic backing sheet, containing therein a thermosetting phenol-aldehyde resin with the particles of said resin distributed substantially uniformly throughout the sheet, and coated on one face with a continuous, substantially dry, film of heat-activatable adhesive, said adhesive having as its major ingredient, a thermosetting, alkaline water-soluble phenol-aldehyde resin and minor proportions of a thermoplastic polyvinyl acetate resin and of walnut shell flour, the amount of adhesive being sufficient to produce a film weighing from about 30 pounds to 150 pounds per 3,000 square feet of sheet surface, appying said strip to the edge face of said plywood panel with the coated side of said strip against the edge face, securing said strip to said edge face by means of pressure and heat sufficient to show a discoloration on the coated side of said strip along the excess portion of said strip and to produce a permanent bond between said strip and said edge face of said plywood panel and a smooth and uniform surfacing, breaking off the excess portion of said strip, and finally smoothing and relieving the resulting edges of said strip.

6. In the finishing of a woody board, the process of forming a surfaced edge of said woody board, which process comprises employing a flexible strip of paper containing therein a thermosetting phenol-formaldehyde resin in an amount of from about 10% to 100% of resin solids based on the dry weight of said paper, the particles of said resin being distributed substantially uniformly throughout said paper, and coated on one face thereof with a continuous, substantially dry, film of heat-activatable adhesive, said adhesive comprising essentially from 60 to 98 parts by weight (solids basis) of a thermosetting, alkaline, water-soluble, phenol-formaldehyde resin and from 2 to 40 parts by weight (solids basis) of a thermoplastic polyvinyl acetate resin, the weight of said resin-containing paper being from about 60 to 300 pounds per 3,000 square feet of paper surface, covering at least one entire edge face of said woody board with said strip, the coated side of said strip being applied against said edge face, and securing said strip to said edge face by means of pressure and heat in the range of from about 270° F. to 550° F. for a time sufficient to produce a permanent bond between said strip and said edge face of said woody board, thereby providing said edge face with a smooth and uniform surfacing.

References Cited in the file of this patent

UNITED STATES PATENTS

| | | |
|---|---|---|
| 1,720,856 | Payne | July 16, 1929 |
| 2,154,143 | Whelan | Apr. 11, 1939 |
| 2,448,638 | Murray et al. | Sept. 7, 1948 |
| 2,474,292 | Weidner et al. | June 28, 1949 |
| 2,565,251 | Malmstrom | Aug. 21, 1951 |
| 2,565,952 | Curran et al. | Aug. 28, 1951 |

FOREIGN PATENTS

| | | |
|---|---|---|
| 120,542 | Australia | Oct. 31, 1945 |
| 583,148 | Great Britain | Dec. 10, 1946 |
| 625,576 | Great Britain | June 30, 1949 |